United States Patent [19]

Sander et al.

[11] Patent Number: 4,493,401
[45] Date of Patent: Jan. 15, 1985

[54] AUTOMATIC BRAKE RESETTING DEVICE

[75] Inventors: Nils B. L. Sander, Osby, Switzerland; Julius Nadas, Eching, Fed. Rep. of Germany

[73] Assignee: Knorr-Bremse GmbH, Munich, Fed. Rep. of Germany

[21] Appl. No.: 434,375

[22] Filed: Oct. 14, 1982

Related U.S. Application Data

[63] Continuation of Ser. No. 117,984, Feb. 4, 1980, abandoned.

[30] Foreign Application Priority Data

Feb. 2, 1979 [DE] Fed. Rep. of Germany ....... 2904028

[51] Int. Cl.³ .................... F16D 65/56; F16D 65/66
[52] U.S. Cl. ................... 188/199; 188/196 D; 188/202
[58] Field of Search ............. 188/196 D, 196 V, 199, 188/202, 203

[56] References Cited

U.S. PATENT DOCUMENTS

| | | | |
|---|---|---|---|
| 3,194,358 | 7/1965 | Brandt | 188/202 X |
| 3,454,140 | 7/1969 | Billeter | 188/202 |
| 3,512,619 | 5/1970 | Rauglas | 188/202 |
| 3,610,376 | 10/1971 | Baronnet | 188/196 D X |
| 3,744,596 | 7/1973 | Sander | 188/196 D X |
| 3,878,924 | 4/1975 | Nadas | 188/196 D X |
| 3,900,086 | 8/1975 | Billeter | 188/202 |
| 3,970,173 | 7/1976 | Sander | 188/203 |

FOREIGN PATENT DOCUMENTS

1455292 3/1974 Fed. Rep. of Germany .

Primary Examiner—George E. A. Halvosa
Attorney, Agent, or Firm—Edmund M. Jaskiewicz

[57] ABSTRACT

An automatic brake resetting device for railway vehicle brakes has two telescopingly displaceable rod members which transmit a braking force. A rotatable coupling element having a threaded shaft with a non-self-locking thread is connected to one of the rod members and a rotary coupling connects the coupling element with the other rod member. The rotary coupling is actuated by axial displacement of the rotatable coupling element with respect to the other rod member and is urged by a spring into the engaged position between the rotatable coupling element and the other rod member. A lever transmits force between a control stop device slideably supported on a guide member and the rotatable coupling element and has such a transmission ratio so as to amplify the force transmitted from a spring of the control stop device to the coupling element.

6 Claims, 5 Drawing Figures

AUTOMATIC BRAKE RESETTING DEVICE

RELATED APPLICATIONS

The present application is a continuation of application Ser. No. 117,984 filed Feb. 4, 1980 and now abandoned.

The present invention relates to an automatic brake resetting device for vehicle brakes, more particularly, to such a device for adjusting automatically the contact stroke of the bake on a railway vehicle.

Various structures of automatic brake linkage adjusting devices have been provided for the brakes on railway vehicles. A particular structure of an automatic brake resetting device has two rod members which are telescopingly displaceable with respect to each other and which transmit the braking force. One rod member is threaded upon a non-self-locking thread on a shaft of a rotatable coupling element and a rotatable coupling is provided for coupling with a non-rotatable portion of the other rod member. The rotary coupling is actuated by axial displacement of the rotatable coupling element with respect to the non-rotatable rod members and is spring-loaded in engaged position. The rotatable coupling element can be coupled when displaced in the direction to open the rotary coupling to a control stop device which acts against the direction of the braking force. The control stop device which closes after a control stroke has a spring element and a lever device and is supported on a guide or reference member that is mounted on a component of the braking system in such a manner that the guide member is displaceable relative to the rotatable coupling element in proportion to the brake stroke. One such automatic brake resetting device is disclosed in the German patent DE-AS No. 1 455 292.

The adjustment device of this German patent is constructed as a pullrod in a conventional H-brake rod wherein one brake rod comprises a threaded spindle having a non-self-locking thread and thus also functions as a screw connection component. The other rod member is tubular and encloses the threaded spindle shaft. A nut screwed upon the spindle shaft has coupling surfaces on both sides thereof which can be coupled to corresponding countersurfaces on the second rod member which also serves as a non-rotatable component. The control stop device has a lever which is pivotally connected to one end to a fixed joint and its other end which is displaced toward the direction of adjustment is pivotally connected to a brake lever of the H-brake rod. A rod is connected to the middle portion of the lever and can be coupled by means of a prestressed spring cylinder to the nut in the releasing direction of the rotary coupling which is otherwise closed by a spring force. In that portion of the brake stroke exceeding the control stroke of the spring cylinder, the spring cylinder will be compressed and thus absorbs a portion of the braking force exerted by the brake cylinder of the H-brake rod. Since the spring cylinder is prestressed higher than the closing force of the spring loading the rotary coupling in the clearing direction, the spring cylinder thus absorbs a significant portion of the braking force.

Another automatic brake resetting device has been disclosed in the U.S. Pat. No. 3,326,335 and has a non-rotatable sleeve connected to a nut as a non-rotatable screw connection part. The nut is screwed upon a non-self-locking thread of a threaded spindle shaft one end of which faces the other rod member and carries a coupling flange with coupling surfaces on both sides thereof. The coupling flange is enclosed by the other tubular rod member upon which countercoupling faces are provided. A sleeve is mounted coaxially with respect to the other rod member and is displaceable against the force of a prestressed spring. The sleeve can be coupled to a reference or guide member by means of a stop device having a play proportional to the control stroke. The aforementioned spring has one end acting against the one rod member and its other end acts through axially displaceable pins and a transmission lever against an axial bearing mounted on the threaded spindle sgaft so as to load the rotary coupling between the coupling flange and the other rod member in the closing direction.

Upon completion of the control stroke so that the stop is closed, the spring can be lifted from the pin by displacement of the sleeve and the rotary coupling is thus disengageable. The transmission lever in this resetting device increases the closing force exerted by the spring on the rotary coupling. Thus, the spring on the one hand can be relatively weak and absorbs only a small portion of the braking force when it is compressed, however, on the other hand, exerts a sufficiently high closing force upon the rotary coupling. The construction perimeters, however, only permit a lever ratio of at most 1:2 so that the maximum force which can be exerted by the spring is twice the closing force on the rotary coupling. Apart from these limitations, this structure can only be used for brake resetting devices wherein the mentioned spring functions as the closing spring for the rotary coupling, but not other springs which may already be provided on the resetting device.

These known brake adjustment or resetting devices can be assembled into the brake rods as separate components and thus are subjected to the brake force in tension. However, there have also been proposed such brake adjustment devices which are assembled in the brake cylinder have substantially the structural features discussed above but are subjected to the braking force in compression.

German patent DE-AS No. 2 201 082 discloses a brake cylinder having a piston which carries a length of pipe having two coupling surfaces to embrace a coupling flange of a rotatable threaded shaft. A compression spring has one end supported against the piston and its other end acts against a rod member representing the piston rod. The piston rod is tubular and encloses the threaded spindle shaft. The end of the piston rod toward the piston carries a nut which is screwed unto the threaded spindle shaft by a non-self-locking thread. In the released state of the brake cylinder, the compression spring closes a rotary coupling positioned between the coupling flange of the threaded spindle shaft and the tubular extension of the piston. A disk cam is mounted for limited axial displacement on a cylindrical shoulder of the threaded spindle sgaft and one side of the cam is supported against the coupling flange by means of a washer and an axial bearing and the other side of the cam faces toward a stop fixed to the housing at a distance corresponding to the control stroke when the brake is released.

During a braking stroke, after closing of the stop, the disk cam opens the rotary coupling against the force of the compression spring. The residual brake stroke after opening of the rotary coupling is then absorbed by elastic deformation of the disk cam or of a washer. The disk cam and washer must oppose this elastic deformation with a resistance which exceeds the prestress of the compression spring and which thus requires a significant portion of the braking force exerted by the piston of the brake cylinder in order to overcome the prestress. Such a brake cylinder has a low degree of efficiency.

It is therefore the principal object of the present invention to provide an improved automatic brake resetting device of the general type described herein for vehicle brakes.

It is another object of the present invention to provide an automatic brake resetting device for vehicle brakes utilizing a control stop device which requires only a small portion of the braking force.

It is a further object of the present invention to provide such an automatic brake resetting device of improved efficiency in operation and having a construction which is relatively simple, rugged but exonomical.

The objects of the present invention are achieved and the disadvantages of the prior art are overcome by providing such an automatic brake resetting device as described above with at least one transmission lever after the spring in the flow path of power from the control stop device mounted on a guide member to the rotatable coupling element. The lever has a transmission ratio which amplifies the force transmitted from the spring of the control stop device to the rotatable coupling element. As a result, only a relatively weak spring element is required to open the rotary coupling against the strong spring loading the coupling in the closing direction. In that portion of the stroke subsequent to the opening of the rotary coupling, the weak spring element is compressed but only a small fraction of the braking force transmitted by the brake rod adjusting device is required for this purpose. The brake rod adjustment or resetting device according to the present invention thus has high efficiency.

According to one aspect of the present invention an automatic brake resetting device particularly for railway vehicles may comprise rod members telescopingly displaceable with respect to each other and which transmit a braking force. A rotatable coupling element has a threaded shaft with a non-self-locking thread which is connected to one of the rod members. A rotary coupling is provided between the rotatable coupling element and the other rod member and the coupling is actuated by axial displacement of the rotatable coupling element with respect to the other rod member. A spring urges the coupling element in a direction to close the coupling. A control stop device which is displaceable through a control distance is slideably supported on a guide member which is so mounted so as to be displaceable with respect to the rotatable coupling element a distance proportional to the brake stroke. A second spring is operatively connected to the control stop device and lever means are provided between the constrol stop device and the rotatable coupling element. The lever means has such a transmission ratio to amplify force transmitted from the second spring to the rotatable coupling element.

In one embodiment the transmission lever has one end pivotally connected to the spring element and its other end connected to the non-rotatable portion of a rod member. Intermediate the ends the transmission lever is connected to the rotatable coupling element. The transmission lever has a longer lever arm between the connection to the spring element and the rotatable coupling element than the lever arm between the rotatable coupling element and the non-rotatable portion of the rod member.

Other objects and advantages of the present invention will be apparent upon reference to the accompanying description when taken in conjunction with the following drawings, which are exemplary, wherein;

Proceeding next to the drawings wherein like reference symbols indicate the same parts throughout the various views a specific embodiment and modifications of the present invention will be described in detail.

Figure 1:
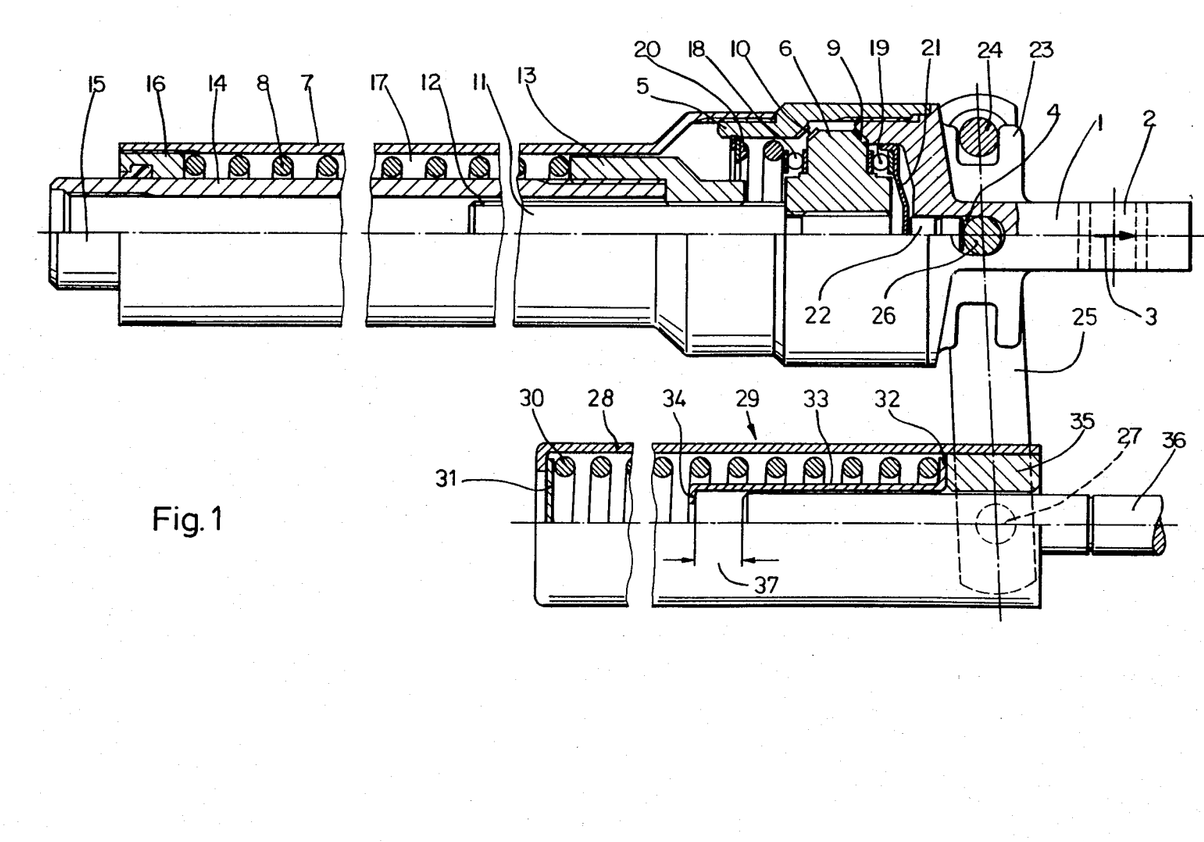
FIG. 1 is a side elevational view of an automatic brake resetting device according to the present invention and portions of the device being shown in longitudinal section.

The brake adjustment or resetting device as shown in FIG. 1 is constructed as a tension rod and has a rod member 1 which is coupled by means of a connecting eye 2 in a known manner through other components of the brake rigging to a brake cylinder (not shown) such that the brake force exerted by the brake cylinder in the direction of the arrow 3 is transmitted to the brake rod adjusting device. The rod member 1 is thus non-rotatable about its longitudinal axis because of the connection between the eye 2 and other components of the brake rigging.

The rod member 1 is provided with a transverse slotted opening 4 which is elongated in the longitudinal direction of the rod member. The rod member 1 is also provided with a tubular extension 5 which encloses a coupling flange 6 and merges into a sleeve 7 within which is assembled a prestressed spring 8. On both sides of the coupling flange 6 there are provided rotary couplings 9 and 10 which may be in the form of a conical or beveled tooth construction and which are engageable with corresponding coupling surfaces on the tubular extension 5. The coupling flange 6 is axially displaceable with respect to the rod member 1 and its tubular extension 5 and is actuated by this axial displacement. When either rotary coupling 9 or 10 is closed the other respective rotary coupling 10 or 9 is opened or disengaged at a predetermined gap as may be seen in FIG. 1.

The coupling flange 6 is mounted at the connecting eye end of a threaded spindle shaft 11 and the spindle shaft 11 together with the coupling flange 6 mounted thereon constitute a rotatable coupling element. A portion of the shaft 11 extends into the sleeve 7 and is provided with a non-self-locking thread 12 upon which is screwed a nut 13. The nut 13 is connected to a second rod member 15 which is telescopingly displaceably mounted within the sleeve 7 and slideable within a closure ring 16 provided with a suitable packing and disposed in the end of the sleeve 7 remote from the connecting eye 2. An end of the rod member 15 projects outwardly of the sleeve 7 and in the usual manner is coupled to the braking elements of a friction brake (not shown) such that the rod member 15 cannot rotate about its longitudinal axis. The prestressed spring 8 is located in an annular space 17 formed between the sleeve 7 and tubular portion 14 of the rod member 15.

The spring 8 is stressed between the closure rings 16 at the end of the sleeve 7 and the nut 13.

A pair of axial or thrust bearings 18 and 19 are carried on both sides of the coupling flange 6. The bearing 18 which is remote from the connecting eye 2 is supported by one end of a prestressed coupling spring 20 the other end of which is supported against an abutment attached to the inner surface of the tubular extension 5. The axial bearing 19 on the other side of the coupling flange 6 is abutted by a pressure plate 21 which is axially displaceable within the tubular extension 5 and covers that end face of the coupling flange 6 directed toward the connecting eye 2. A short pin or rod 22 is slideably mounted in an axial bore of the rod member 1 and extends into the slotted opening 4. One end of the pin 22 abuts the pressure plate 21 on its side surface away from the coupling flange 6.

The rod member 1 is provided with a non-rotatable radially projecting mounting boss 23 in which is received a cross-bolt 24 with a radial play toward the rod member 1. The cross-bolt 24 is carried at one end of a transmission lever 25 which extends across the rod member 1 substantially perpendicularly thereto. A further cross-bolt 26 passes through the slotted opening 4 and is also connected to the lever 25 and is abutted on its surface remote from the eye 2 by the pin 22.

A control stop device 29 is constructed in the form of a spring cylinder and has a cylindrical housing 28 which is pivotally connected to the lower end of the lever 25 by a bolt 27. The lever arm of the transmission lever 25 is longer between the bolts 26 and 27 than the lever arm between the bolts 24 and 26. A prestressed spring 30 which is relatively weak with respect to the forces exerted by the prestressed springs 8 and 20 is located within the housing 28 which extends substantially parallel and adjacent to the rod member 1. One end of the spring 28 is supported by a closure member 31 mounted on an internal flange on one end of the housing 28 and on the other end upon an external flange 32 of a tubular member 33 disposed within the housing 28. The tubular member 33 is positioned within the spring 30 and extends in the direction toward the closure 31. This end of the tubular member 33 is provided with an internal flange 34. A closure ring 35 is fixed in the other end of the housing 28 in the region of the pivotal connection between the pin 27 and lever 25 and retains the tubular member 33 and spring 30 within the housing 28. A cylindrical reference or guide member 36 projects through the closure ring 35 into the tubular extension 33 and terminates at a control distance 37 from the inner flange 34. The control stop device 29 is thus slideably supported on the guide member 36. The guide member 36 is connected to the vehicle frame or to a component of the brake rod in a manner known in the art such that during braking the guide member 36 will be displaced a distance proportional to the brake stroke with respect to the rod member 1. The reference or guide member 36 is mounted so as to be adjustable with respect to the rod member 1 so that even when the position of the transmission lever 25 does not change the control distance 37 is adjustable.

FIG. 1 illustrates all of the components of the adjustment device in their positions when the brake is released. The rotary coupling 9 is retained in its closed position by the sum of the forces exerted by the prestressed spring 8 and the coupling spring 20.

When the brake resetting device is correctly adjusted, the contact stroke of the brake, or the distance the brake must travel before contact is made between the braking surfaces, is at the desired distance. In carrying out a braking operation with the correctly adjusted brake resetting device, the brake adjustment device, as illustrated in FIG. 1, will be displaced as a unit in the direction of the arrow 3. The movement of the brake resetting unit will be transmitted to the lever 25 without any pivoting of this lever so that the housing 28 of the spring cylinder 29 will be correspondingly displaced. As the housing 28 is moved, the flange 34 will approach the end of the guide member 36 as the control distance 37 is decreased. When the brakes are applied upon initial contact of the braking surfaces, the inner flange 34 will at that time precisely engage the guide member 36.

Upon further movement of the rod member 1 in the direction of the arrow 3, the rod member 15 will encounter a resistance to further movement because of the engagement of the brake surfaces and this resistance to movement quickly exceeds the prestressed force of the spring 8. As result, the nut 13 will prevent further movement of the spindle shaft 11 together with its coupling flange 6; and as a result, the rotary coupling 9 will be opened and the rotary coupling 10 will be closed.

Simultaneously with the resistance to further movement of the rod member 15, the housing 28 of the spring cylinder 29 will be prevented from further movement by means of the guide member 36 and the spring 30. Upon further movement of the rod member 1 in the direction of the arrow 3, the lever 25 will be pivoted in a clockwise direction around the bolt 24 and will thus move the bolt 26 in the slotted opening 4 in the direction opposite to the arrow 3 against the pin 22. The pin 22 moves the pressure plate 21 against the axial bearing 19 to cause the coupling flange 6 to move toward the left, as viewed in FIG. 1, whereupon the rotary coupling 10 is closed.

Continuing of the braking stroke moves the rod member 1 further in the direction of the arrow 3 and braking force is transmitted through the closed rotary coupling 10, coupling flange 6, threaded spindle shaft 11, nut 13, and tubular member 14 which carries with it the rod member 15 so as to increase the force being applied by the vehicle brake. The lever 25 is also further pivoted through bolts 24 and 27 so that the housing 28 is displaced in the direction of the arrow 3 and the spring 30 is compressed against the closure member 35. Since the spring 30 is relatively weak, compression of this spring absorbs only a very small percentage of the total braking force acting on the rod member 1 so that substantially the entire braking force is transmitted by the rod member 1 to the rod member 15. It is thus apparent that this brake resetting device has a high degree of efficiency since there is only a negligibly small loss of braking power.

When there is too much play in the brake rigging and the brake contact stroke is too great, during a braking operation the brake rod adjustment device will initially be displaced to the right in the direction of the arrow 3 as shown in FIG. 1 as described above. The entire adjustment device as a unit will be displaced in this direction until the inner flange 34 contacts the end of guide member 36 and the tubular member 33 holds back the right hand end of spring 30 by means of the outer flange 32. Because of the excessive play in the brake contact stroke, the brakes will not yet be applied when the flange 34 engages guide member 36.

Upon subsequent displacement of the rod member 1 under the action of the braking cylinder, the relatively weak spring 30 will be able to restrain the housing 28 of the spring cylinder 29 with the result that the transmission lever 25 will pivot about its end bolt 24. This pivoting of the lever 25 displaces the cross-bolt 26 to the left in the slotted opening 4 with respect to the rod member 1 and causes a displacement to the left of the pin 22, the pressure plate 21, the coupling flange 6 together with the threaded shaft 11 against the forces of the springs 8 and 20 until the rotary coupling 9 is released. The spring 30 is weaker than the sum of the forces exerted by the springs 8 and 20 and also corresponding to the transmission ratio of the lever 25.

After release or disengagement of the rotary coupling 9 and with the rotary coupling 10 still in its open or disengaged position, the force exerted by the prestressed spring 8 acting upon the nut 13 by means of the non-self-locking thread 12 causes a rotation of the threaded shaft 11 together with its coupling flange 6 such that the nut 13 is screwed to the right as viewed in FIG. 1. This movement to the right of the nut 13 will also displace the rod member 15 to which it is attached to the right with respect to the rod member 1 until the vehicle brakes are applied. The excess portion of the contact stroke of the vehicle brake is thus adjusted or set. Tightening or increased application of the vehicle brakes to exert greater braking effort and thus tightening of the brake stroke will occur under the compression of the spring 30 as already described above.

In the event that the contact stroke of the friction brake is too short, initiation of the braking operation will apply the brakes before the internal flange 34 engages the end of the guide member 36. Upon application of the brakes there will be rapidly increasing resistance to the movement to the right of the rod member 15 upon further displacement to the right of the rod member 1. Accordingly, rod member 15 through its nut 13 will compress spring 8 and through the nut 13 and the threaded shaft 11 the coupling flange 6 will be displaced toward the left with respect to the tubular extension 5 against the force of the coupling spring 20 until the rotary coupling 9 is disengaged. Upon disengagement of rotary coupling 9, the threaded shaft 11 will be screwed to the right with respect to the nut 13 under the action of the force of the coupling spring 20 such that together with coupling flange 6 the shaft 11 will be displaced in accordance with further movement of the rod member 1. The total length of the brake rod adjustment device will be increased by this relative movement between threaded shaft 11 and rod member 15.

As soon as the internal flange 34 engages the end of guide member 36, the housing 28 will be restrained by the spring 30. Upon further displacement of the rod member 1 to the right, the lever 25 will be pivoted in a clockwise direction around the cross-bolt 26 until the coupling flange 6 is displaced to the left with respect to the tubular extension 5 by means of the cross-bolt 26, pin 22, pressure plate 21 and the axial bearing 19 until rotary coupling 10 is closed. The braking force is then transmitted through the closed rotary coupling 10 from the rod member 1 through the nut 13 to the rod member 15 since the threaded shaft 11 is kept from rotating. This additional braking force will then increase the application of braking force to the brakes. During this increased application of braking force, the lever 25 will be carried along by the bolts 24 and 26 in an unchanged pivotal position so that the housing 28 of the spring cylinder 29 will also move corresponding to the movement of the rod member 1. The movement of housing 28 will then compress the spring 30.

By lengthening of the brake rod adjustment device as described above, the brake contact stroke which was initially too small is not increased to its correct and proper distance.

In each of the above situations, upon release of the vehicle brake, the rod member 1 will be displaced to the left opposite to the direction of the arrow 3, as shown in FIG. 1, until bare contact between the braking surfaces or zero braking force is achieved. During this release, displacement of rod member 1, the rotary coupling 10 will remain coupled and the housing 28 under the action of the unpivoted lever 25 will be displaced to the left as the spring 30 relaxes until the closure ring 35 abuts on the outer flange 32 and the spring 30 is again retained on both its ends by portions of the housing 28.

Upon further displacement of the rod member 1 to the left during release of the brakes and with the vehicle brake application force acting on the rod member 15 but diminishing, the springs 8 and 20 will enable rod 15 together with nut 13, the threaded shaft 11 and the coupling flange 6 to be displaced to the right with respect to the rod member 1 as in FIG. 1. Coupling 10 will become disengaged, rotary coupling 9 will become engaged and under the action of pressure plate 21, pin 22 and cross-bolt 26 the lever 25 will rotate about the bolt 24 into the position shown in FIG. 1.

On continuation of the release stroke of the vehicle brakes, all components of the brake rod adjustment device, with the exception of the reference member 36, are displaced to the left until the spacing 37, as shown in FIG. 1, is again achieved between the flange 34 and the guide member 36. At this point, the brake release operation has been completed.

The adjustment device of FIG. 1 can be modified by replacing the coil spring 8 with a pneumatic spring to function as the prestressed spring element. In this modification the annular space 17 is constructed as a cylinder space which is continuously connected to a source of fluid under pressure, such as compressed air, and which may comprise the air reservoir of the air braking system of the vehicle. The cylinder will guide the nut 13 in the sleeve 7 sealed by a piston seal applied to its outer periphery and a pressure-tight dirt and dust-proof seal is provided between the closure ring 16 and the rod member 15. In such a modification, the entire length of the sleeve 7 can be used as the spring stroke region for the pneumatic prestressed spring and the overall structure length of the brake rod adjustment device can thus be shortened considerably.

The device as shown in FIG. 1 can be modified so as to be provided with an inner transmission lever device and thus avoid the outer transmission lever 25 which may be H-shaped or may comprise doubled or parallel members. Such a modification is shown in FIG. 2.

Figure 2:
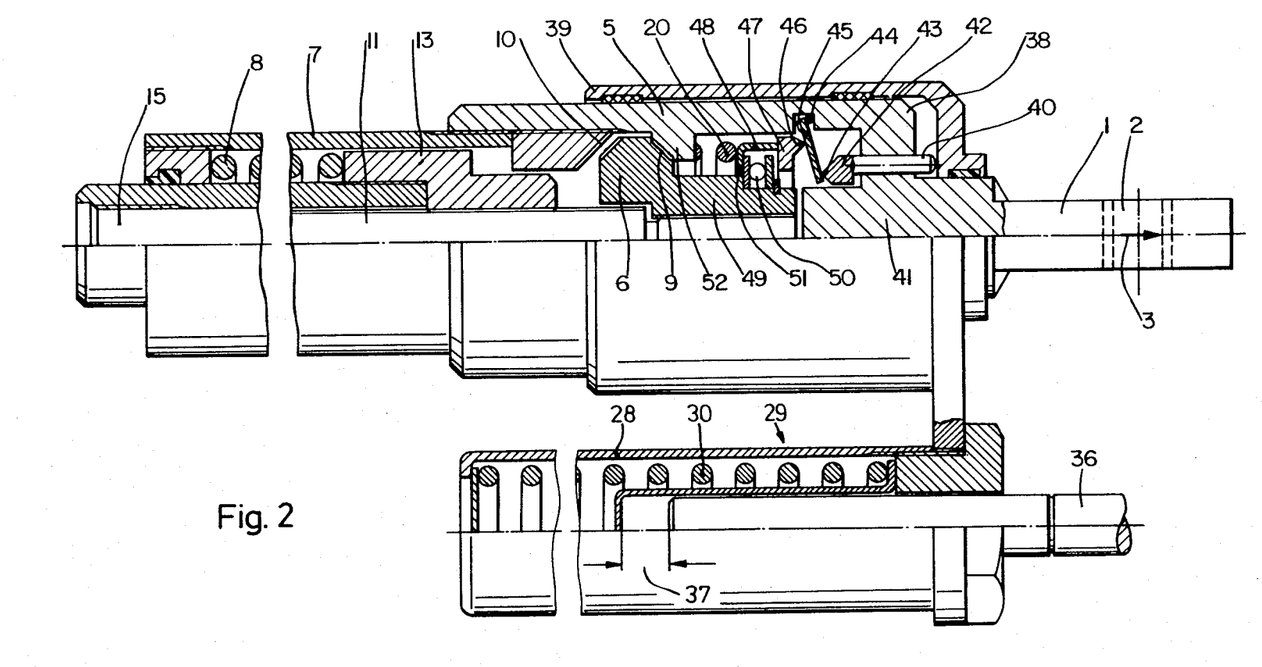
FIG. 2 is a view similar to that of FIG. 1 but showing a modification thereof.

In the brake rod adjustment device of FIG. 2, a sleeve 39 is displaceably mounted on the tubular extension 5 which is connected to the rod member 1 having the connecting eye 2 therein. The sleeve 39 is provided with suitable sliding seals so as to protect its enclosure from dirt and foreign matter. A connecting arm connects the sleeve 39, at least in the operating direction opposite to the direction of the arrow 3, securely to the housing 28 of the spring cylinder 29 which is of the same construction as shown in FIG. 1.

A plurality of pins 40 are slideably positioned in openings in a radial wall 38 on an axle stub 41 of the operating rod 1 and the pins 40 are displaceable axially with respect to the rod adjustment device. The right ends of the pins 40, as seen in FIG. 2, are engageable with the inner radial surface of sleeve 39 and the other ends of the pins 40 engage a mounting ring 42 which is slideably mounted so as to be axially displaceable on the axle stub 41. On the side of the mounting ring 42 opposite the direction of the arrow 3, there is formed a wire or O-ring 43 which functions as a radially inner mounting for a conical annular member 45 supported in the direction of the arrow 3 against the tubular extension 5 by means of a further wire ring 44. The "wire rings" are rings similar to the known O-rings but are made of a suitable metal so as to provide a rounded contact surface for the conical annular member 45 and to function in a manner as to be presently described.

Figure 5:
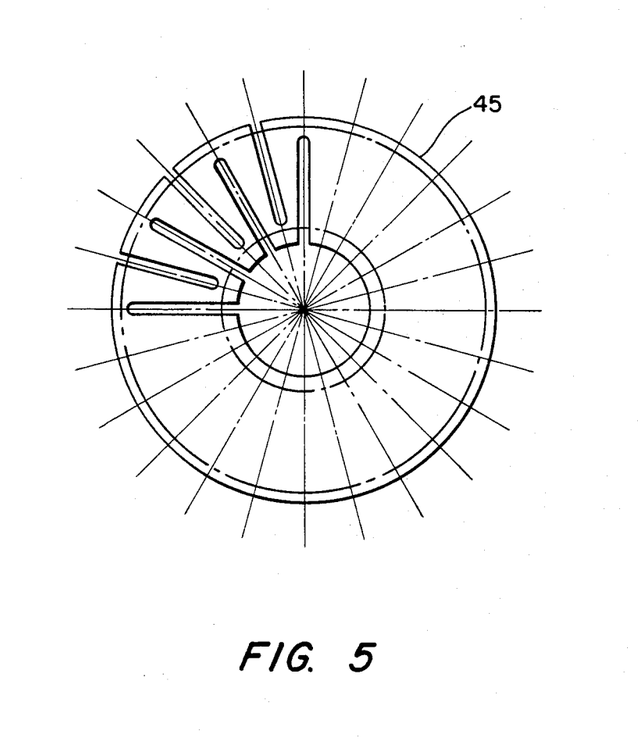
FIG. 5 is a plan view of the conical member used in FIGS. 2 and 3.

In FIG. 5 there is shown the conical annular member 45 which functions comparably to the transmission lever 25 is of a variable bevel angle so as to be deformed under very small forces. The annular member 45 is sub-divided by a plurality of circumferentially spaced radial slots extending from one of the peripheral edges and terminating short of the other peripheral edge so as to thus form a plurality of individual lever levers. A preferable construction is that these radial slots begin alternatingly from the radially inner and radially outer peripheral edges of the annular element 45.

The surface of the conical annular member 45 away from the direction of the arrow 3 engages a third wire ring 46 radially inwardly of the wire ring 44 located at the outer peripheral edge of the annular element 45. The ring 46 is located on a coupling ring 47 the other side of which engages a tubular sleeve 48 having an annular flange 51 which projects radially inwardly and encloses an axial bearing 50 positioned on a cylinder shoulder 49 of the coupling flange 6. The axial bearing 50 performs the functions of both axial bearings 18 and 19 of the adjustment device of FIG. 1.

The coupling spring 20 is clamped between the annular flange 51 and the annular flange 52 which is formed as a portion of the tubular extension 5 and which also forms a portions of the rotary coupling 9. The coupling spring 20 thus urges the annular flange 51 against the axial bearing 50 which is supported by the shoulder 49 upon the coupling flange 6 to maintain the rotary coupling 9 closed, as shown in FIG. 2.

The remaining components of the brake rod adjustment device according to FIG. 2 correspond to those of FIG. 1 and are designated by the same reference numerals.

The brake rod adjustment device modification of FIG. 2 functions in a similar manner to the device of FIG. 1 as described above except that the transmission by the lever 25 of the uncoupling force exerted by the spring 30 on rotary coupling 9 of FIG. 1 is effected in the modification of FIG. 2 by the conical annular member 45. During a braking operation, as soon as the control distance 37 has been traversed, the housing 28 of the spring cylinder 29 together with the sleeve 39 are restrained by the guide member 36 by means of the spring 30 and the axial pins 40. As result, the mounting ring 42 is displaced to the left with respect to the rod member 1 as shown in FIG. 2. The wire ring 43 thus presses on the inner peripheral edge of the conical annular member 45 so that its conical or bevel angle is increased or that the interconnected radial levers rotate about the abutment point on wire ring 44 in the direction approach a radial plane. The wire ring 46 and the coupling ring 47 are then displaced to the left with an amplified force corresponding to the lever transmission ratio determined by the differences in the radii of the wire rings 43, 44, and 46. The axial bearing 50 is thus relieved of any force since the flange 51 on sleeve 48 will be urged to the left to compress the coupling spring 20. The rotary coupling 9 will then be disengaged by a small relative displacement to the left of the coupling flange 6 with respect to the tubular extension 5. The transmission of forces by the conical annular member 45 thus has the effect that the relatively weak spring 30 can release the rotary coupling 9 against the forces of the considerably stronger coupling spring 20 and prestress spring 8.

The brake rod adjustment device of FIG. 2 can be modified to incorporate the spring element of the control stop device as well as the transmission lever within and coaxially of the brake rod adjustment device. In this modification the screw connection consisting of the threaded shaft and the nut mounted thereon has reversed functions with respect to the non-rotatable and rotatable screw connection components.

Figure 3:
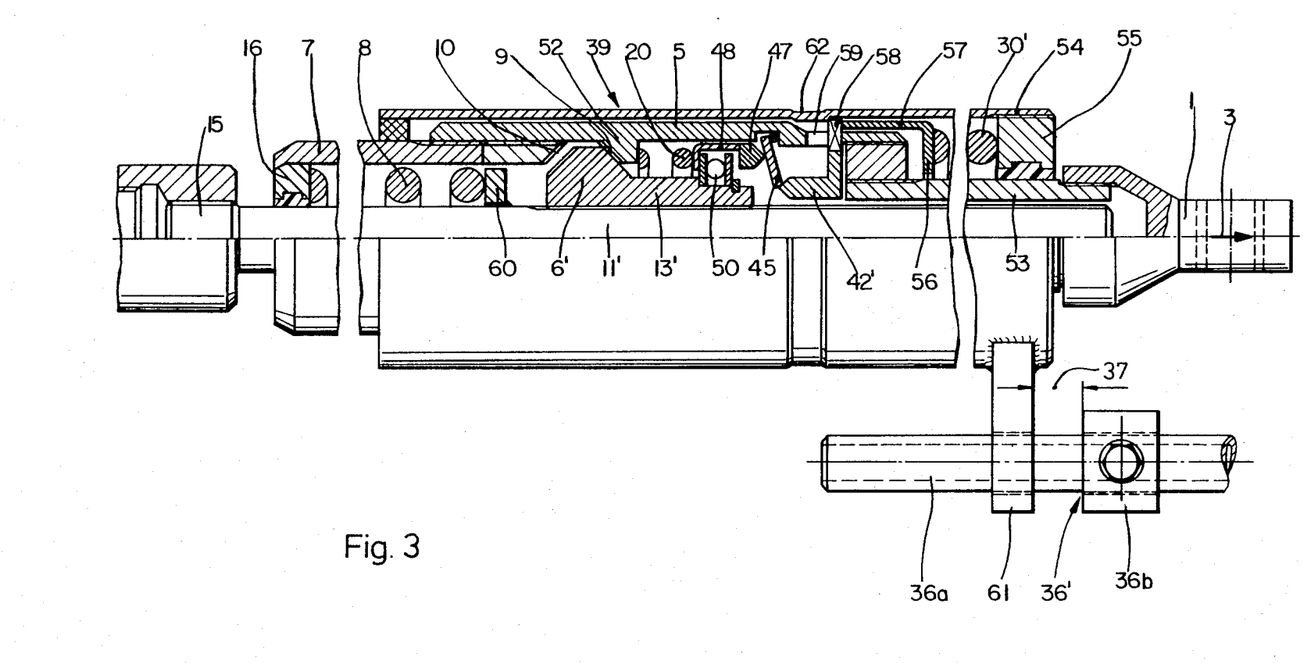
FIG. 3 is a view similar to that of FIG. 1 and showing still a further modification of the present invention.

As may be seen in FIG. 3, the rod member 1 has a tubular section 53 in which is received a portion of the threaded shaft 11' and is surrounded by spring 30'. The spring 30' is enclosed by a tubular section 54 of the sleeve 39. The spring 30' is clamped between an end ring 55 fixed within the end of tubular section 54 and an annular flange 56. The end ring 55 is slideably positioned upon the tubular section 53. The annular flange 56 is constructed as an internal flange of a slideable sleeve 57 which is axially displaceable between the tubular extension 5 of rod member 1 and the sleeve 39.

A mounting ring 42' is positioned within the tubular extension 5 and surrounds the threaded shaft 11' with a radial clearance and is provided with radially extending arms 58 which project through slotted openings 59 in the tubular extension 5. The end of the sleeve 57 toward the connection eye 2 abuts the radial arms 58.

The beveled ring wheel or conical annular member 45 is supported on its peripheral inner edge against the mounting ring 42' and radially outwardly supported as described for FIG. 2 against the coupling ring 47. The peripheral outer edge of conical annular member 45 is supported against a suitable wire ring within the sleeve extension 5. The coupling spring 20 is clamped, as described in FIG. 2, between the annular flange 52 and the axial bearing 50 by means of the sleeve 48 extending from the coupling ring 47. The axial bearing 50 is enclosed by the sleeve 48 and is mounted on the nut 13' which in this modification represents the rotatable screw connection component in contradistinction to the structures of FIGS. 1 and 2. The nut 13' also carries the coupling flange 6' which can be coupled by means of the rotary couplings 9 and 10 to the tubular extension 5 and thus to the rod member 1 which is a non-rotatable component. The threaded shaft 11' which forms the non-rotatable component of the screw connection is securely and non-rotatably fastened to the rod member 15. The prestressed spring 8 is clamped between the closure ring 16 of the sleeve 7 and an annular flange 60 on the threaded shaft 11'.

The tubular section 54 of the sleeve 39 has a radially projecting bracket or shoulder 61 and is provided with an axially extending bore within which is slideably received reference member 36a on which is adjustably mounted a stop 36b. The reference 36a thus forms together with the stop 36b the guide or reference member 36'. When the brake is released, the stop 36b is opposite to the shoulder 61 in the direction of the arrow 3 at the distance 37. The bore within bracket 61 which receives the reference member 36a is axially parallel to the adjustment device.

In order to retain the prestressed condition of the spring 30, the sleeve 39 is provided with a plurality of axially extending depressions 62 which define an inner shoulder against which are supported the arms 58 of the mounting ring 42' and and the sleeve 57 is supported against the arms 58. The shoulder formed by the depressions 62 is to the left of the arms 58 as seen in FIG. 3.

It is to be borne in mind that the nut 6', 13' of FIG. 3 is threaded on the spindle 11' by threads having such a pitch as to be non-self locking. As a result of this threading, when neither of the clutches 9 and 10 are engaged, the spindle 11' may be axially displaced by means of the rotating nut 6', 13', as long as this nut 6', 13' is prevented from any axial movement which would engage one of the clutches 9, 10. Opening of the clutch 9 in FIG. 3 will be caused by either of the following situations:

A. Upon the transmission of a very high force when the components are in their relative positions as shown, which would correspond to the situation where there is insufficient slack in the brake rigging;

B. When there is excessive slack in the brake rigging, so that there is only a slight resistance in the brake rigging against movement of the brake device after the distance 37 is exceeded. In the case of A above, during the braking stroke the entire device will move to the right as the result of force exerted on the rod 1 in the direction of the arrow 3. As soon as the slack or play in the brake linkage is overcome, the springs 8 and 20 will be compressed as a result of the transmitted braking force since the brake surfaces are now in engagement. The compression of springs 8 and 20 will cause the spindle 11' and the nut 6', 13' to be displaced relatively toward the left as viewed in FIG. 3. This relative movement of the spindle and the nut to the left with respect to the elements 1, 53, 5 and 7 will cause the clutch 9 to open. The nut 6', 13' is now free to rotate on the ball bearing 50 but is prevented from any axial movement closing the clutch 10 because of the force exerted by the spring 20. In the case of B above, movement of the entire device to the right under a braking force exerted by the rod 1 in the direction of arrow 3 will overcome the control distance 37. Since there is still slack in the rigging, continued movement to the right of the rod 1 will cause the element 42' to remain stationery as a result of the force exerted by the spring 30. However, the sleeve 5, the spindle 11', and the nut 6', 13' will continue to move as a unit toward the right. The conical annular member 45 will now function as a lever and force the clutch 9 to open acting through the element 47 and the right hand race of the ball bearing 50.

As soon as the clutch 9 has opened, the spring 8 will expand and push the spindle 11' into the slack adjustor device and thereby shorten the length of the brake force transmitting rigging to compensate for the excessive slack in the brake rigging.

During the braking stroke, the bracket or shoulder 61 will traverse the control distance 37 to engage the stop 36b. The tubular section 54 together with the sleeve 39 will be retained against further movement to the right and the spring 30 will exert a force to the annular flange 56, the sleeve 57, radial arms 58, mounting ring 42', conical annular member 45 modifying the spring force, the coupling ring 47 and the tubular member 48 to unload the nut 13' from the force of the coupling spring 20 and from the prestressed spring 8, so that rotary coupling 9 is disengaged. In all other respects the operation of the brake rod adjustment device of FIG. 3 corresponds to the operation of the device of FIG. 2, bearing in mind the interchangeability of the functions of the threaded shaft 11' and nut 13' as non-rotatable or rotatable screw connection components respectively. This operation has already been described above.

Figure 4:
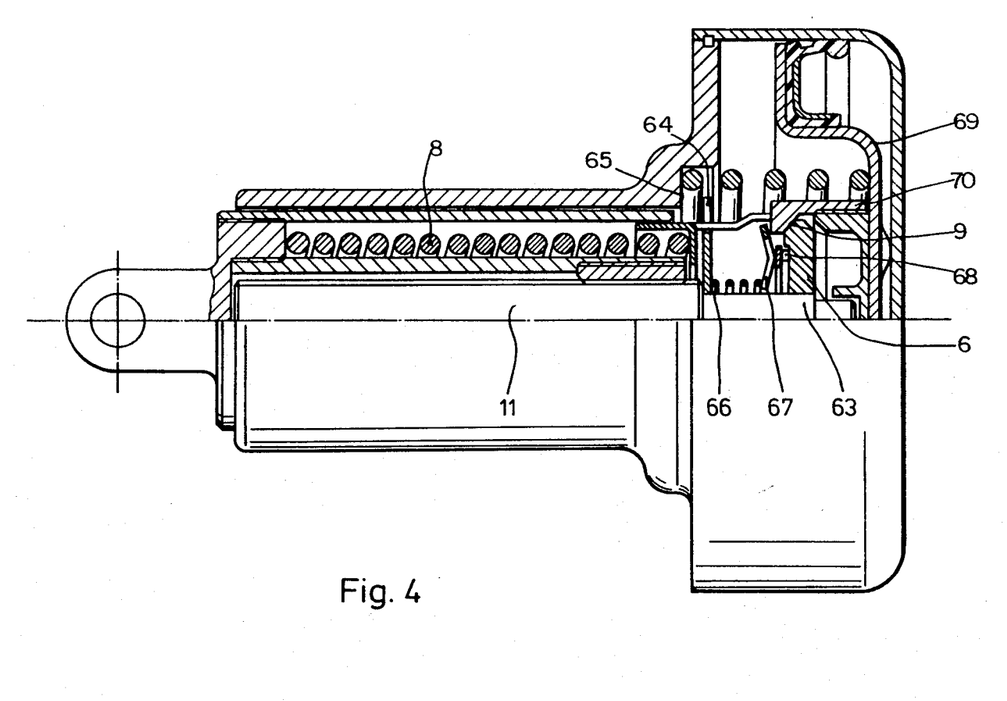
FIG. 4 is a view similar to that of FIG. 1 and showing yet another form of the present invention.

In FIG. 4 there is illustrated a braking cylinder having an integral or built-in brake rod adjustment device which corresponds in its general arrangement and mode of operation to the brake cylinders disclosed in German Pat. DE-AS No. 2 201 082. Only those components of the braking cylinder which function according to the present invention need be described at this time.

A rigid flexible disk cam 64 is slideably mounted so as to be displaceably axially on a cylindrical section 63 between the threaded shaft 11 forming the rotatable screw connection part and the coupling flange 6. The peripheral outer edge portion of the disk cam 64 is opposite to and engageable with a fixed stop 65 formed on the housing but offset in the braking direction by the distance of the control stroke.

A compression spring 66 which surrounds the cylindrical section 63 has one end abutting the side of the cam disk 64 toward the piston and the other end of the spring 66 supported against the peripheral inner ends of the plurality of radially extending transmission levers 67. The coupling flange 6 abuts the transmission levers 67 in their central region by means of an axial bearing 68. The transmission levers 67 are supported on their radially outer portions against a sleeve 70 connected to the piston 69 on the piston side. The transmission levers 67 can be constructed as an interconnected annular disk similar to the conical annular member described above.

When the piston 69 is acted upon by compressed air in a braking stroke in a known manner, the outer edge of the cam disk 64 after traversing the control distance, will abut against the housing stop 65 and will be retained by this stop against further movement. The relatively weak compression spring 66 is able upon continuing of the piston stroke through the force transmitted at the transmission levers 67 to hold back the coupling flange 6 against the force of the prestressed spring acting on it to release the rotary coupling 9 between the side of the coupling flange 6 away from the piston and sleeve 70.

During further portions of the braking stroke as braking force is being applied, the compression spring 66 is compressed. Since the spring 66 is relatively weak it absorbs, however, only a small portion of the force exerted by the piston 69 and thus complies with the requirement for a high operating efficiency of the brake cylinder.

The remaining construction and function of the brake cylinder as described in FIG. 4 substantially corresponds to known structures and need not be further described.

It is thus apparent that one of the features of the present invention is that the force transmission lever is mounted with one end directly on a spring element and its other end on a non-rotatable component and between these connections the lever is connected to the rotatable screw connection component. In addition, the transmission lever has a longer lever arm between the spring element connection and the rotatable screw connection component than the lever arm between the rotatable screw connection part and the connection to the non-rotatable component.

The control stop device is thus constructed as a prestressed spring cylinder adjacent to and parallel to the rod members. The spring cylinder is provided with an input element which is coupled to a guide or reference member through a stop coupling which has a play or clearance proportional to the control stroke. The spring cylinder also has an output element which is pivotally connected to the one end of the transmission lever.

The force transmission lever may also be constructed as a bevel ring wheel or conical annular member having a variable bevel angle and mounted so as to be coaxial to the rotatable screw connection component. The conical annular member is thus constructed similar to that of a washer force transmitting lever which is integrated into the brake rod adjustment device and thus well protected against damage which might occur under operating conditions.

The invention as disclosed herein can be employed on various structures of brake rod adjustment devices some of which have been described herein.

In the FIG. 2 embodiment also, the spring element can be a component of a prestressed spring cylinder or accumulator mounted adjacent and parallel to the rod members. The spring element similarly comprises an input member which can be coupled to the guide or reference member by means of a stop coupling having a clearance or play proportional to the control stroke. The spring cylinder may also comprise an input element which is connected to a sleeve mounted for axial displacement on at least one of the rod members and the sleeve can be coupled to one of the peripheral edges of the conical annular member.

It will be understood that this invention is susceptible to modifications in order to adapt it to different usages and conditions and, accordingly, it is desired to comprehend such modifications within this invention as may fall within the scope of the appended claims.

What is claimed is:

1. In an automatic brake resetting device particularly for railway vehicles, first and second rod members telescopingly displaceable with respect to each other and which transmit a braking force, a rotatable coupling element having a threaded shaft with a non-self locking thread thereon connected to one of said rod members, rotary coupling means between said rotatable coupling element and a non-rotatable portion of the other rod member and being actuated by axial displacement of said rotatable coupling element with respect to said non-rotatable rod member portion, a first spring acting upon said rotary coupling element in a direction to close said rotary coupling means, a control stop device slideably supported on a guide member and displaceable through a control distance, said guide member being so mounted as to be displaceable with respect to said rotatable coupling element a distance proportional to the brake stroke, a second spring operatively coupled to said control stop device, lever means for coupling said control stop device, said non-rotatable rod member portion and said rotatable coupling element to transmit force therebetween upon displacement of said rotatable coupling element in a direction to open said rotary coupling means, said lever means having such a transmission ratio to amplify force transmitted from said second spring to said rotatable coupling element, said lever means comprising a variable angle conical annular element coaxial to said rotatable coupling element, said annular element having inner and outer peripheral edge portions, the outer peripheral edge portion being operatively connected to the other rod member and the inner peripheral edge portion being operatively connected to said control stop device, and an annular portion of said annular element between said peripheral edge portions being operatively connected to said rotatable coupling element, said conical annular element having a longer lever arm between said inner peripheral edge and said coupling element connection, said conical annular element having a plurality of radial slots beginning at one peripheral edge and terminating short of the other peripheral edge, and an axial bearing on said rotatable coupling element and acted upon by said first spring, a coupling ring axially displaceable with respect to one of said rod members engaging said conical annular element and disposed on the side of said axial bearing away from said first spring, and an axially displaceable tubular element positioned radially outwardly of said axial bearing having on one end thereof a flange disposed between said first spring and said axial bearing and another end thereof connected to said coupling ring.

2. In an automatic brake resetting device as claimed in claim 1 wherein said connections to said conical annular element comprise wire rings.

3. In an automatic brake resetting device as claimed in claim 1, wherein said radial slots alternatingly begin from one and the other peripheral edges.

4. In an automatic brake resetting device as claimed in claim 1, wherein said second spring and said control stop device define a prestressed spring cylinder substantially parallel to said rod members and having an input portion and an output portion, said input portion comprising a stop engageable with said guide member, said output portion being connected to a sleeve mounted for axial displacement on at least one of said rod members, and means for operatively connecting said sleeve to a peripheral edge portion of said conical annular element.

5. In an automatic brake resetting device as claimed in claim 4 wherein said connecting means comprises a plurality of axially displaceable pins slideably mounted in a radial wall portion of the rod member, and a mounting ring axially displaceable on said rod member and engageable with the peripheral edge portion of the conical annular element.

6. In an automatic brake resetting device as claimed in claim 1, and further comprising a sleeve mounted for co-axial displacement on at least one of said rod members, means including said control stop device for connecting said sleeve to said guide member, means between said sleeve and rod member for limiting the axial displacement of said sleeve with respect to said rod member, a mounting ring axially displaceable on said rod member and engageable with a peripheral edge portion of the conical annular element, said second spring interposed in an annular space between said sleeve and said rod member and having one end acting upon said sleeve and its other end acting upon said mounting ring.

* * * * *